(12) United States Patent
Bowden et al.

(10) Patent No.: US 8,073,828 B2
(45) Date of Patent: Dec. 6, 2011

(54) LICENSED RIGHTS CLEARANCE AND TRACKING FOR DIGITAL ASSETS

(75) Inventors: Curtis W. M. Bowden, Los Angeles, CA (US); David M. Crandall, Burke, VA (US); David Edward Reeder, Malibu, CA (US); Jonathan Frederick Schupp, Smithsburg, MD (US); Sung H. Shin, Germantown, MD (US)

(73) Assignee: Curbis Corporation, Seattle, WA (US)

( * ) Notice: Subject to any disclaimer, the term of this patent is extended or adjusted under 35 U.S.C. 154(b) by 170 days.

(21) Appl. No.: 11/763,347

(22) Filed: Jun. 14, 2007

(65) Prior Publication Data

US 2008/0313226 A1 Dec. 18, 2008

(51) Int. Cl.
*G06F 17/00* (2006.01)
(52) U.S. Cl. .................. 707/705; 707/E17.005; 705/53; 705/59; 705/901
(58) Field of Classification Search .............. 707/104.1, 707/E17.005, 705, 999.107; 705/53, 59, 705/901
See application file for complete search history.

(56) References Cited

U.S. PATENT DOCUMENTS

| | | |
|---|---|---|
| 4,337,483 A | 6/1982 | Guillou et al. |
| 5,201,047 A | 4/1993 | Maki et al. |
| 5,241,671 A | 8/1993 | Reed et al. |
| 5,251,316 A | 10/1993 | Anick et al. |
| 5,260,999 A | 11/1993 | Wyman |
| 5,263,158 A | 11/1993 | Janis |
| 5,317,507 A | 5/1994 | Gallant |
| 5,319,705 A | 6/1994 | Halter et al. |
| 5,325,298 A | 6/1994 | Gallant |
| 5,438,508 A | 8/1995 | Wyman |
| 5,442,778 A | 8/1995 | Pedersen et al. |
| 5,493,677 A | 2/1996 | Balogh et al. |
| 5,532,839 A | 7/1996 | Beikirch et al. |

(Continued)

FOREIGN PATENT DOCUMENTS

WO    WO-02/19147    3/2002

OTHER PUBLICATIONS

Getty Images, License Information located at<http://creative.gettyimages.com/source/home/license.aspx>, visited Jul. 6, 2006, Copyright 1999-2006, 2 pages.

(Continued)

*Primary Examiner* — Tim T Vo
*Assistant Examiner* — Shiow-Jy Fan
(74) *Attorney, Agent, or Firm* — Soquel Group, LLC

(57) ABSTRACT

Rights clearances management for assets, such as media assets. A rights brokerage service enables potential licensees to clears rights to use assets within designated projects, such as advertising campaign projects. The potential licensee uses an interface to select or identify an asset without necessarily accessing the asset itself. The rights holders and the rights held by each rights holder are identified based on the asset identity. A request is automatically issued to the rights holders to approve use of the asset for the project. The potential licensee may use an interface to track progress of approvals from the rights holders. Unenforceable rights are detected and approval is automatically obtained. If all enforceable rights are cleared, the asset may be committed for approval by a project manager or other authority. When approved, a license to use the asset is automatically created between the potential licensee and each of the rights holders.

22 Claims, 6 Drawing Sheets

U.S. PATENT DOCUMENTS

| | | | |
|---|---|---|---|
| 5,553,143 | A | 9/1996 | Ross et al. |
| 5,600,775 | A | 2/1997 | King et al. |
| 5,629,980 | A | 5/1997 | Stefik et al. |
| 5,642,502 | A | 6/1997 | Driscoll |
| 5,675,819 | A | 10/1997 | Schuetze |
| 5,682,487 | A | 10/1997 | Thomson |
| 5,706,497 | A | 1/1998 | Takahashi et al. |
| 5,721,902 | A | 2/1998 | Schultz |
| 5,758,257 | A | 5/1998 | Herz et al. |
| 5,765,152 | A | 6/1998 | Erickson |
| 5,778,362 | A | 7/1998 | Deerwester et al. |
| 5,794,249 | A | 8/1998 | Orsolini et al. |
| 5,813,014 | A | 9/1998 | Gustman |
| 5,832,495 | A | 11/1998 | Gustman |
| 5,832,499 | A | 11/1998 | Gustman |
| 5,850,561 | A | 12/1998 | Church et al. |
| 5,864,845 | A | 1/1999 | Voorhees et al. |
| 5,875,446 | A | 2/1999 | Brown et al. |
| 5,903,892 | A | 5/1999 | Hoffert et al. |
| 5,938,724 | A | 8/1999 | Pommier et al. |
| 5,987,459 | A | 11/1999 | Swanson et al. |
| 5,991,876 | A * | 11/1999 | Johnson et al. ............... 726/28 |
| 6,006,221 | A | 12/1999 | Liddy et al. |
| 6,006,241 | A | 12/1999 | Purnaveja et al. |
| 6,012,068 | A | 1/2000 | Boezeman et al. |
| 6,038,333 | A | 3/2000 | Wang |
| 6,072,904 | A | 6/2000 | Desai et al. |
| 6,125,236 | A | 9/2000 | Nagaraj et al. |
| 6,138,119 | A | 10/2000 | Hall et al. |
| 6,243,713 | B1 | 6/2001 | Nelson et al. |
| 6,349,373 | B2 | 2/2002 | Sitka et al. |
| 6,385,596 | B1 | 5/2002 | Wiser et al. |
| 6,404,441 | B1 | 6/2002 | Chailleux |
| 6,523,028 | B1 | 2/2003 | DiDomizio et al. |
| 6,546,405 | B2 | 4/2003 | Gupta et al. |
| 6,574,609 | B1 | 6/2003 | Downs et al. |
| 6,574,622 | B1 | 6/2003 | Miyauchi et al. |
| 6,578,072 | B2 | 6/2003 | Watanabe et al. |
| 6,578,073 | B1 | 6/2003 | Starnes et al. |
| 6,581,055 | B1 | 6/2003 | Ziauddin et al. |
| 6,618,808 | B1 | 9/2003 | Johnson et al. |
| 6,735,583 | B1 | 5/2004 | Bjarnestam et al. |
| 6,834,130 | B1 | 12/2004 | Niikawa et al. |
| 6,868,192 | B2 | 3/2005 | Takiguchi |
| 6,871,009 | B1 | 3/2005 | Suzuki |
| 6,920,610 | B1 | 7/2005 | Lawton et al. |
| 6,944,340 | B1 | 9/2005 | Shah |
| 6,947,959 | B1 | 9/2005 | Gill |
| 7,099,849 | B1 * | 8/2006 | Reeder et al. ............... 705/59 |
| 7,266,704 | B2 * | 9/2007 | Levy ............... 713/193 |
| 7,523,072 | B2 * | 4/2009 | Stefik et al. ............... 705/59 |
| 2001/0000191 | A1 * | 4/2001 | Barkan et al. ............... 705/59 |
| 2001/0032189 | A1 * | 10/2001 | Powell ............... 705/59 |
| 2002/0000998 | A1 | 1/2002 | Scott et al. |
| 2002/0077986 | A1 | 6/2002 | Kobata et al. |
| 2002/0082997 | A1 | 6/2002 | Kobata et al. |
| 2002/0141584 | A1 * | 10/2002 | Razdan et al. ............... 380/203 |
| 2003/0085997 | A1 | 5/2003 | Takagi et al. |
| 2004/0039916 | A1 | 2/2004 | Aldis et al. |
| 2004/0158731 | A1 | 8/2004 | Narin et al. |
| 2004/0205333 | A1 | 10/2004 | Bjorkengren |
| 2005/0262154 | A1 * | 11/2005 | Cooper ............... 707/200 |
| 2006/0242139 | A1 | 10/2006 | Butterfield et al. |
| 2007/0073626 | A1 | 3/2007 | Reeder et al. |
| 2007/0100768 | A1 | 5/2007 | Boccon-Gibod et al. |

OTHER PUBLICATIONS

Harman et al., "Inverted Files," Information Retrieval: Data Structures & Algorithms, Prentice Hall PTR, 1992, pp. 28-43.

Salton, Gerard et al., "Introduction to Modern Information Retrieval," McGraw-Hill, Inc., 1983, 14 pgs.

Vellucci, Sherry L. "Metadata," Annual Review of Information Science and Technology, 1998, vol. 33, pp. 187-222.

Wool, Gregory "A Meditation on Metadata," E-Serials: Publishers, Libraries, Users and Standards, 1998, 10 pgs.

New Services Simplify Online Reprint Requests by Organization and Individuals; Agreement Marks 1st Content-Licensing Arrangment for UPI, Feb. 3, 2004, St. Paul, Minnesota, 3 pgs., http://www.icopyright.com/news/pr20040203.html, accessed May 8, 2004.

Media & Digital Asset Management v2.5, IntegritSistem, 3 pgs., http://www.integritsistem.com/mam/index.htm, accessed Aug. 3, 2004.

Final Cut Pro HD Gives You Powerful, Intuitive Content Management Tools That Let You Consolidate, Relink, Mark and Store your Digital Assets for Quick Retrieval, Apple Computer, Inc., 2 pgs., http://www.apple.com/finalcutpro/content.html, accessed Aug. 3, 2004.

What is a CareyDAM?, 2 pgs., http://www.dambigidea.com/indexinstantinfo.html, accessed Aug. 3, 2004.

DSMCi Chosen to be Lead Integrator for Discovery Communication's/Discovery Images' Digital Media Management System, DSMCi, Aug. 6, 1998, Beltsville, MD, 3 pgs., http://www.dsmci.com/press_080698_discovery.html, accessed Aug. 3, 2004.

Rada, Roy "Hypertext Writing and Document Reuse: The Role of a Semantic Net," Electronic Publishing, Aug. 1990, vol. 3(3), pp. 125-140.

Lohner, Joe "Machine Conceptualization of Natural Language Text," A Thesis Submitted to the Division of Research and Advanced Studies of the University of Cincinnati, 1995, pp. 1-315.

Zanir, Oren et al. "Fast and Intuitive Clustering of Web Documents," Department of Computer Science and Engineering, 1997, pp. 1-8.

Koller, Daphne et al. "Hierarchically Classifying Documents Using Very Few Words," pp. 1-16.

Buckley, Chris et al. "Using Clustering and SuperConcepts Within SMART: TREC 6," SabIR Research, Department of Computer Science, Ithaca, NY, 17 pgs.

\* cited by examiner

LICENSED RIGHTS CLEARANCE AND TRACKING FOR DIGITAL ASSETS

FIELD OF ART

The invention is directed to the management of rights in assets, and more particularly, to managing clearance and tracking of digital content rights.

BACKGROUND

A content management system, such as a Digital Asset Management system (DAM) is often employed to enable multiple users to store, search, and access content that is owned or licensed. This content is generally provided as one or more media assets in a digital format, such as pictures, text, videos, graphics, illustrations, images, audio files, fonts, colors, and the like. Conventional media asset management systems provide for storage, search and retrieval of media assets, but often the assets are not available for permitted use without obtaining approvals associated therewith. Moreover, there may be incomplete knowledge, or even no knowledge, of whose approvals are required.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION

Figure 1:
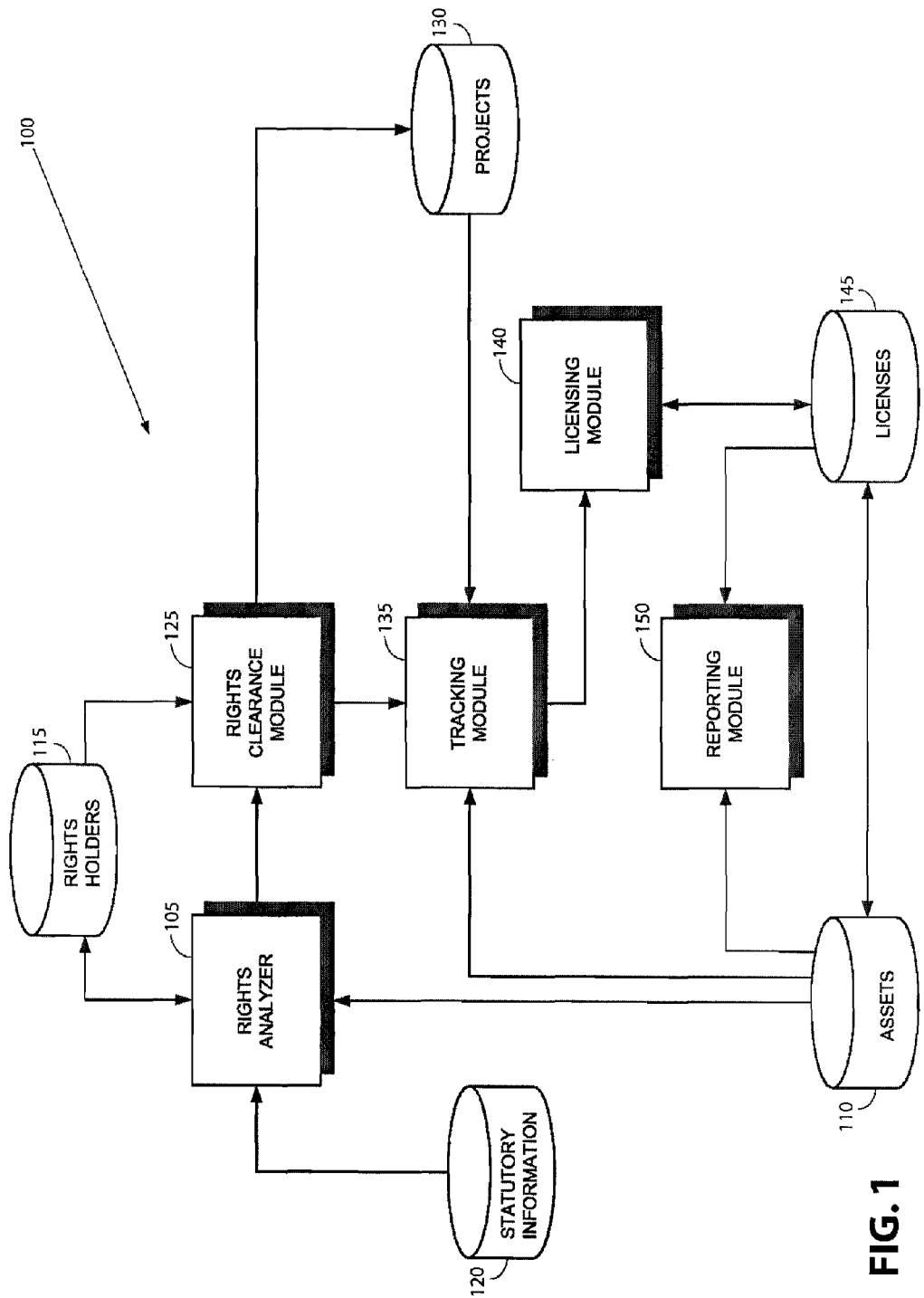
FIG. 1 is a simplified block diagram of a rights clearance and tracking system, in accordance with an embodiment of the present invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be implemented in different embodiments as methods, processes, processor readable mediums, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

Briefly, embodiments of the present invention relate to rights management for songs, pictures, movies and other such media assets. Among other things, the present invention enables a rights brokerage service to clear rights for assets that are owned by first parties, for license to second parties to use within designated projects, such as advertising campaign projects. For example, a second party, B, may desire to license an asset owned by first parties A1, A2, . . . , An, for use within an automobile advertising campaign. In this case, the present invention may be used to broker the process of identifying parties A1, A2, . . . , An, and obtaining necessary clearances therefrom.

Conventional media asset management systems provide for storage, search and retrieval of media assets, but often the assets are not available for permitted use without obtaining approvals associated therewith. Moreover, there may be incomplete knowledge, or even no knowledge, of whose approvals are required. Embodiments of the present invention complement such conventional media asset management systems by making it easy for customers who want to license the media for their use, to identify and obtain the requisite approvals.

Generally, rights approvals include (i) grant of licenses to use media, and (ii) approval of the way the media is presented within a specific project. Approvals may be based on guidelines, such as trademark layout guidelines. The party that grants the licenses may be different from the party that approves the media usage.

An aspect of the present invention provides a collaborative workflow for identifying, tracking and obtaining clearances and approvals from rights holders to use media in projects. Rights licensors, rights approvers, rights brokers and rights licensees collaboratively use embodiments of the present invention to select assets of interest, to clear rights, to approve presentation of media within projects, to track progress of clearances and approvals, and to obtain requisite licenses.

The media itself need not be present. If used in conjunction with a media asset management system, the media does not need to be accessed during the clearance process provided by embodiments of the present invention. Thumbnail images and meta-data can be used to represent the media assets. Access to the media assets themselves is deferred until required clearances have been obtained. In other aspects of the invention, a delivery mechanism can be used to deliver an asset once the rights are cleared. For instance, a licensor may provide a "master" element for final use, which is deliverable to a licensee via an embodiment of the invention.

Aspects of the present invention decouple the process of obtaining clearances and approvals to use media assets, from the assets themselves. In distinction from conventional licensing systems, the media assets need not be ingested into a media asset management system, and need not be available to the rights brokerage service. Such assets, which have not been ingested, are referred to as "meta-data only" assets, and are tracked and cleared in place of, or in addition to the actual media assets.

Other aspects of the present invention include reporting and auditing tools, which enable licensees and rights holders to review their licenses and see, for selected media assets, which licenses are in force and which licenses were previously granted. Rights holders can review licenses for the assets in which they hold rights, and licensees can review licenses for the assets which they use. By linking licenses to assets, this aspect of the present invention provides a variety of views including, but not limited to, views keyed on asset, project, license, rights holder and licensee.

Another aspect of the present invention also incorporates statutory copyright information, to automatically recognize that certain approvals are not required by copyright law.

It will thus be appreciated that the present invention includes aspects that serve as the basis for a powerful clearance center for media assets.

Reference is now made to FIG. 1, which is a simplified block diagram of a rights clearance and tracking system 100, in accordance with an embodiment of the present invention. System 100 is a one-stop clearing house, which enables customers to license media assets for use in their projects, by identifying and clearing rights from appropriate holders of rights to the media assets. System 100 may operate in conjunction with a digital asset management system (not shown) that holds a large searchable archive of media assets. Alternatively, system 100 may operate in isolation, solely as a clearing house. System 100 may be implemented entirely in hardware, entirely in software, or in a combination of hardware and software. System 100, or individual components may comprise one or more electronic devices, such as a server, a personal computer, a mobile device, a cellular phone, and/or other devices. The components may be coupled through a network, such as an intranet or the internet Similarly, the entire system may be coupled to client devices and/or other resources through a network. The device, or devices, generally include a communication interface, a processor, a memory, an input device, and an output device that are generally coupled together via a communication bus. A machine readable medium, such as a storage disc, a transmission line, or other medium may be used to store or transmit data and/or machine instructions, which may be processed by the processor to perform a number of operations. As shown in FIG. 1, example system 100 includes five components and five databases, which are described in detail hereinbelow.

Rights Analyzer 105

Shown in FIG. 1 is a rights analyzer 105, which analyzes one or more specified media assets and identifies appropriate holders of rights to the assets. A customer, for example, may search a database 110 of media assets, and find and select one or more media assets which he is interested in incorporating within a project. Generally the customer does not know the identity of the rights holders to the selected assets. By clicking on a graphical user interface control, e.g., a "Clear Rights for these Media Assets" button, the customer invokes system 100, which in turn invokes rights analyzer 105. Rights analyzer 105 accepts as input, an identifier of the one or more selected media assets, and produces as output a list of one or more entities that hold rights to the selected assets.

Alternatively, or in addition, the customer may input media assets or media asset descriptors into system 100 from one or more sources external to system 100, for assets that are not archived in database 110, or even for assets that are archived in the database, but that the customer has located in external sources. In accordance with an embodiment of the present invention, when such externally sourced assets enter system 100, they are subsequently entered into database 110 as "meta-data only" assets if they are not already stored in the database. Thus, the media asset itself and/or only the descriptors are entered into the database 110.

In accordance with an embodiment of the present invention, database 110 includes inter alia data that conforms to a schema with metadata as indicated in TABLE I.

TABLE I

Metadata Schema for Media Asset Database 110

| Metadata | Description |
| --- | --- |
| Asset ID | Key: Unique identifier for asset |
| Asset description | Title or other descriptor of asset |
| Location of Asset | File system location of digital asset, if available; NIL for "metadata only" assets |
| Asset Date #n (n = 1, 2, . . . ) | A copyright date associated with the asset, such as its date of creation, its date of publication, the date of its author's death, etc. |
| Date Type #n | Type of copyright date for Date #n |

In one embodiment of the present invention, rights analyzer 105 operates by using available media asset metadata that includes rights holder information. Such metadata may have been prepared manually, partially automatically or fully automatically. In another embodiment of the present invention, rights analyzer 105 operates by using databases, optionally third party databases, that provide rights holder information based on digital fingerprints of media, such as the Gracenote database used to identify songs. In yet another embodiment of the present invention, a media editor manually provides rights holder information to rights analyzer 105 via a graphical user interface. The media editor may, for example, visually review photos and identify celebrities and trademarks that appear in the photos. The present invention provides a user interface for the media editor, e.g., with a control activated by an "Add Rights Holder" button, for entering rights holders. To assist the media editor, the "Add Rights Holder" button includes a drop down list of various types of rights holders, including inter alia studios, writers, actors and trademarks, and the media editor can enter rights holder data according to type.

As shown in FIG. 1, rights analyzer 105 also accesses a database 115 that maintains information about rights holders and the assets in which they hold rights. In accordance with an embodiment of the present invention, database 115 may be pre-populated with rights holder information, and also updated when rights analyzer 105 identifies new rights holders, or new assets held by already known rights holders.

In accordance with the present invention, database 115 includes inter alia data that conforms to a schema with metadata as indicated in TABLE II.

TABLE II

Metadata Schema for Rights Holder Database 115

| Metadata | Description |
| --- | --- |
| Rights holder ID | Key: Unique identifier for rights holder |
| Rights holder description | Title or other descriptor for rights holder |
| Asset #n (n = 1, 2, . . . ) | ID of asset #n for which rights holder has rights |
| Type of right #n | Studio, writer, actor, etc. for asset #n |

In addition, rights holder entity information is also stored, including inter alia rights holder name, point of contact, postal address, telephone number, e-mail address, payment information and the like.

It will be appreciated by those skilled in the art that there are generally multiple rights holders to a single piece of media. Use of a movie with a soundtrack, for example, may require licenses from a large number of licensors, including inter alia holders of rights to:

still copyright
footage copyright
story copyright
characters copyright
talent #1, talent #2, . . .
music master recording rights
music composition rights
lyrics
trademarks
property rights
personality rights
privacy rights and further including inter alia guilds such as:
Directors Guild of America (DGA)
Writers Guild of America (WGA)
American Federation of Musicians (AFM)
Screen Actors Guild (SAG)

In general, customers are often not able to identify these rights holders on their own. Many customers are also not able or are unwilling to negotiate with rights holders directly for the requisite licenses that the customers need. Embodiments of the invention enable a customer to obtain the needed licenses. Before committing to a license, a customer may explore licensing issues for a number of assets to determine which asset, if any, suits the customer's needs. The customer may obtain a list of rights that are needed for various assets. The customer may also employ a consulting service to evaluate potential complexities and/or a likelihood of success in obtaining needed rights for various assets. In one example, a customer may consider using a film clip, and ask a service to assess all rights embedded within the clip. For instance, the customer may not be aware that designer sunglasses worn by an actor in the clip may require a clearance. The customer or service may evaluate the complexity and/or likelihood of obtaining the necessary clearance before deciding whether to pursue licensing that clip or another clip.

In accordance with an embodiment of the present invention, rights analyzer 105 further accesses a database 120 of statutory information that specifies conditions under which licenses are not required for media assets in various states, and in various countries around the world. For example, in many territories publicity rights for a person expire at a fixed number of years after the person's death. When rights analyzer 105 identifies such rights, it consults database 120 to determine whether or not a license is required in a given territory during a given time span. For example, a customer may select a media asset for use in Germany, with a photograph of Albert Einstein. Albert Einstein died in 1955, and database 120 may indicate that publicity rights in Germany expire 50 years after death, in which case rights analyzer 105 determines that a license to the publicity rights of Albert Einstein is no longer required.

In accordance with an embodiment of the present invention, database 120 includes inter alia data that conforms to a schema with metadata as indicated in TABLE III.

TABLE III

Metadata Schema for Statutory Information Database 120

| Metadata | Description |
| --- | --- |
| Statute ID | Key: Unique identifier for statute |
| Statute reference | Reference to appropriate section of copyright statute |
| Territory | Geographical region (state, country, etc.) |
| Type of right | Publicity, composition, guild, etc. |
| Expiration condition | Condition upon which copyright ends |

Rights Clearance Module 125

Rights clearance module 125 is used to obtain approvals and clearances from the rights holders identified by rights analyzer 105. In accordance with an embodiment of the present invention, rights clearance module 125 provides a graphical user interface through which rights holders can review license requests, negotiate license fees and terms, grant licenses, and approve media for use in customer projects. Rights clearance module 125 uses rights holder database 115 to authorize rights holders to view specific customer projects.

In some instances rights holders may grant conditional licenses, dependent upon approval of a final version of the customer project. As mentioned hereinabove, the party responsible for reviewing and approving the final version may be different than the party granting the rights, and the present invention provides interfaces for both such parties.

In some instances rights holders may assign or sub-license their rights to a licensing agency that uses system 100, in which case system 100 itself can directly grant licenses and approve media usages. Assets in database 110 may then be tagged according to whether they are model released (e.g., approved by a person, who's image or other aspect is included in an asset), or subject released (e.g., approved by an owner of art or other subject matter included in an asset), or both.

In accordance with embodiments of the present invention, rights clearance module 125 stores clearance information in a project database 130. Project database 130 is used to organize projects into component assets, and maintain clearance status for each component asset in each overall asset in a project. Component assets may include portions of an overall asset, such as a song heard within a film clip.

In accordance with embodiments of the present invention, database 130 includes inter alia data that conforms to a schema with metadata as indicated in TABLE IV.

TABLE IV

Metadata Schema for Project Database 130

| Metadata | Description |
| --- | --- |
| Project ID | Key: Unique identifier for customer project |
| Project Description | Title or other descriptor for project |
| Customer ID | ID of project owner - potential licensee |
| Asset #m (m = 1, 2, . . . ) | ID of asset #m selected for potential use in project |
| Rights Holder #m:n (n = 1, 2, . . . ) | ID of rights holder #n for asset #m |
| Status #m:n | Clearance status of rights holder #m:n (approved, pending, denied) |

Tracking Module 135

Tracking module 135 is used to progressively track rights clearances as various rights holders grant or decline to grant licenses to assets selected for customer projects. A customer may view the status of his project and see which licenses have been granted, which licenses have been denied, and which licenses are pending. In accordance with an embodiment of the present invention, clearance information is written to database 130 by rights clearance module 125. Tracking module 135 accesses project database 130 to retrieve the current clearance information to display.

Figure 2:
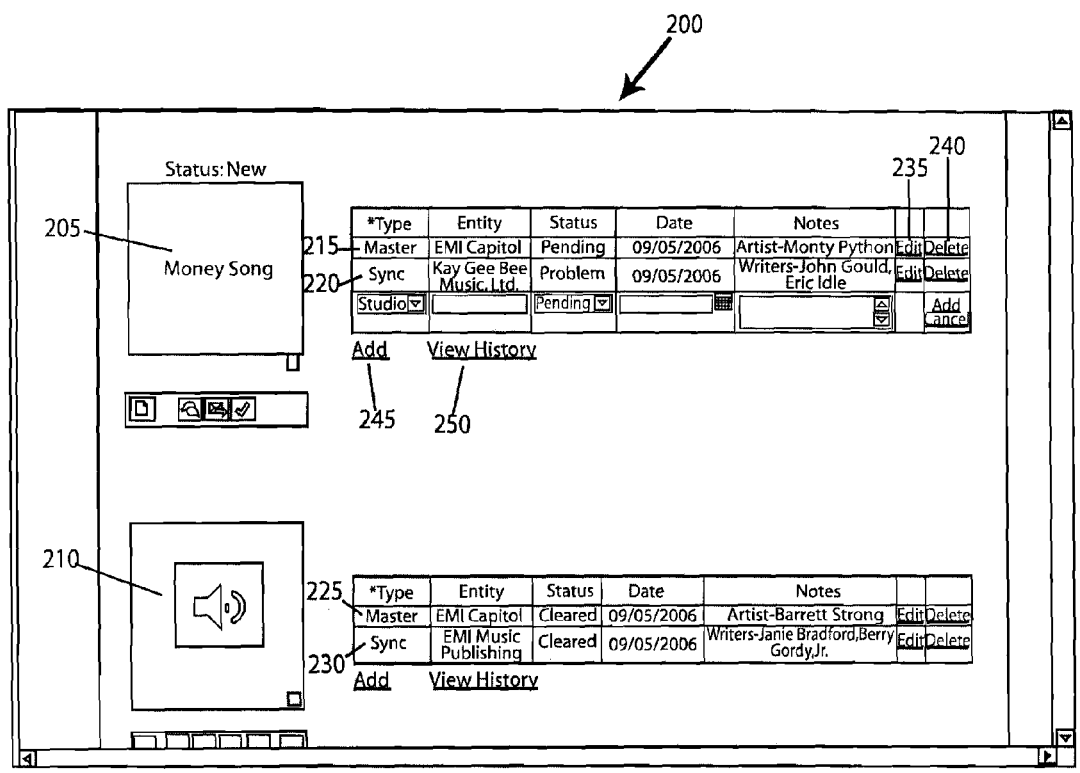
FIG. 2 is a sample user interface for tracking rights clearance of selected assets of interest for use within a project, in accordance with an embodiment of the present invention.

To this end, reference is now made to FIGS. 2-6, which illustrate various tracking information provided by tracking module 135. FIG. 2 is a sample user interface for tracking rights clearance of selected assets of interest for use within a project, in accordance with an embodiment of the present invention. Shown in FIG. 2 is a window 200 including thumbnail images representing assets. Thumbnail image 205 represents a composition entitled "Money Song", and thumbnail image 210 represents a song by artist Barrett Strong.

The information displayed in window 200 corresponds to a specific project under development. The assets represented by the thumbnail images correspond to assets that were selected by a potential licensee using this embodiment of the present invention, to be considered for possible incorporation within his project.

Alongside each thumbnail image is a list of rights holders for the corresponding asset, as generated by rights analyzer 105. The list for "Money Song" includes an entry 215 for a master rights holder, EMI Capitol, and an entry 220 for a sync (i.e., composition) rights holder, Kay Gee Bee Music, Ltd. Each entry includes a status indicator, indicating the status of the rights clearance vis a vis the corresponding rights holder. As shown in FIG. 2, the clearance with EMI Capitol is pending, and the clearance with Kay Bee Gee Music, Ltd. has encountered a problem. Similarly, the list for the song by Barrett Strong includes an entry 225 for a master rights holder, EMI Capitol, and an entry 230 for a sync rights holder, EMI Music Publishing. The clearance with both of these rights holders is indicated as cleared.

Each entry in the list of rights holders has a control 235 for editing the rights information, and a control 240 for deleting the entry. These are generally used by administrators rather than by licensees. Levels of security can be applied to control access to these functions. Below the list is a control 245 for adding a new entry. In accordance with an embodiment of the present invention, changes to the list of rights holders are recorded in a log, and available for review via a control 250. When a user activates control 250, a history of revisions is displayed, as in FIG. 3.

Figure 3:
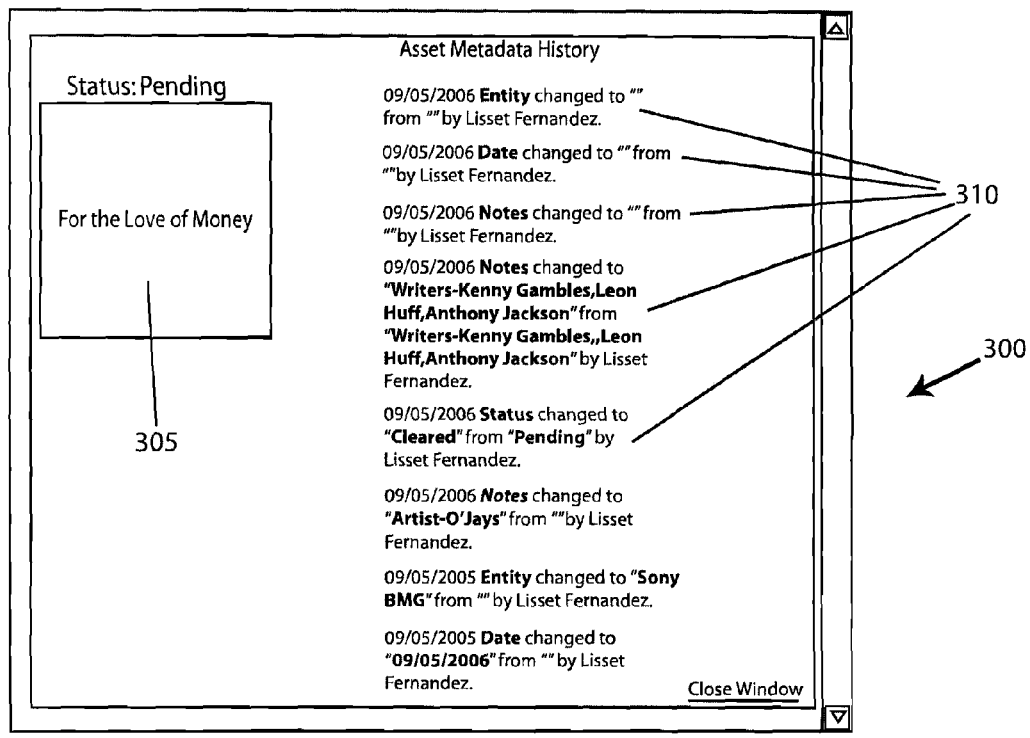
FIG. 3 is a sample user interface for reviewing a history of revisions made to rights clearance information, in accordance with an embodiment of the present invention.

Reference is now made to FIG. 3, which is a sample user interface for reviewing a history of revisions made to rights clearance information, in accordance with an embodiment of the present invention. Shown in FIG. 3 is a window 300 that includes a thumbnail image 305 representing an asset, such as the movie "For the Love of Money" indicated in the figure. To the right of thumbnail 305 is a log of changes 310 made to the rights clearance list for the corresponding asset. For example, on Sep. 5, 2006 the status was changed from "Pending" to "Cleared".

Figure 4:
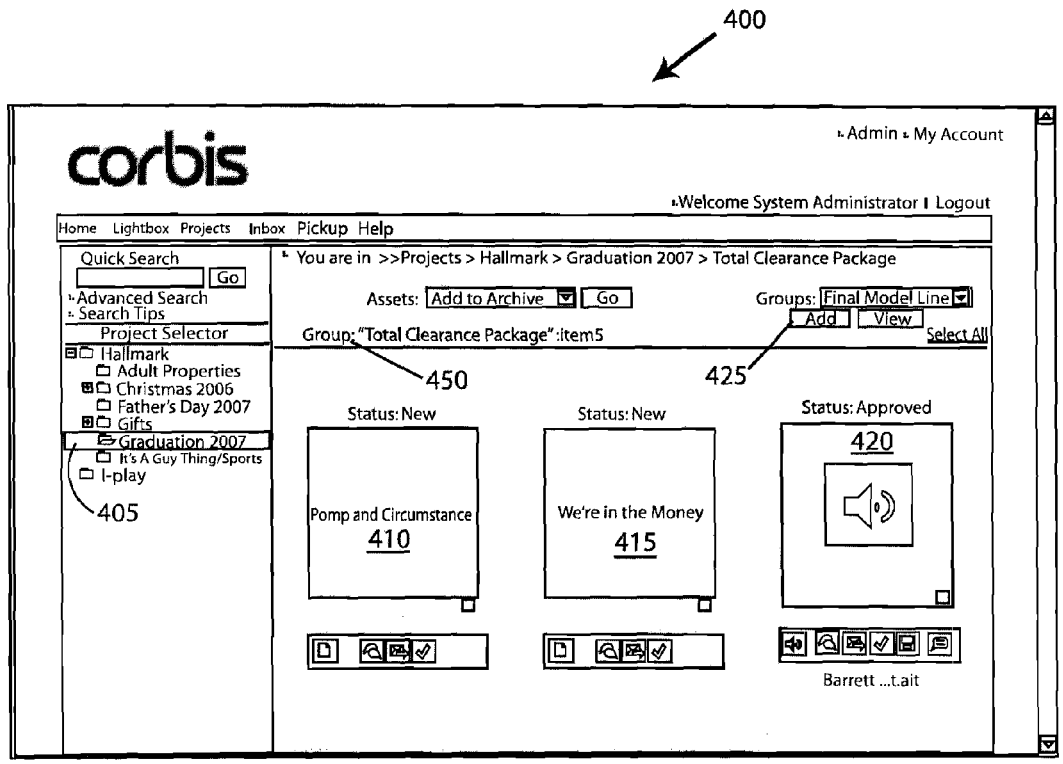
FIG. 4 is a sample user interface for viewing assets for which all rights have been cleared for use within a project, in accordance with an embodiment of the present invention.

Reference is now made to FIG. 4, which is a sample user interface for viewing assets for which all rights have been cleared for use within a project, in accordance with an embodiment of the present invention. Shown in FIG. 4 is a window 400 that displays thumbnails for assets selected by a potential licensee for consideration for use within a project 405 entitled "Graduation 2007". Specifically, the thumbnails in window 400 correspond to those of the selected assets which belong to a "Total Clearance Package" group 450; namely, those of the selected assets for which all required rights have been cleared for use in project 405. Other projects under development are shown in the left pane of window 400, and a user can select from any of them.

In accordance with an embodiment of the present invention, an asset is automatically moved into the Total Clearance Package 450 when all of the asset's rights have been cleared; e.g., when the status of each entry in the asset's list of rights holders is "Cleared" for project 405. Conversely, if the status of one or more entries in the list of rights holders should change from "Cleared" to a different status, then the asset is automatically pulled from the Total Clearance Package 450.

The Total Clearance Package 450 shown in FIG. 4 includes a movie "Pomp and Circumstance" 410, a movie "We're in the Money" 415, and a song by artist Barrett Strong 420. Assets in Total Clearance Package 450 are eligible to be committed to a group, such as Final Model Line, by selecting an asset and selecting an Add button 425.

In accordance with an embodiment of the present invention, rights clearance module 125 notifies a rights holder when an asset is waiting for his clearance. Such notification may be inter alia by e-mail or text message. Tracking module 135 notifies a potential licensee when one or more assets that he selected have been totally cleared. Depending on how the process was initiated, a license agreement may be automatically completed, or may be offered to a potential licensee for final execution.

Figure 5:
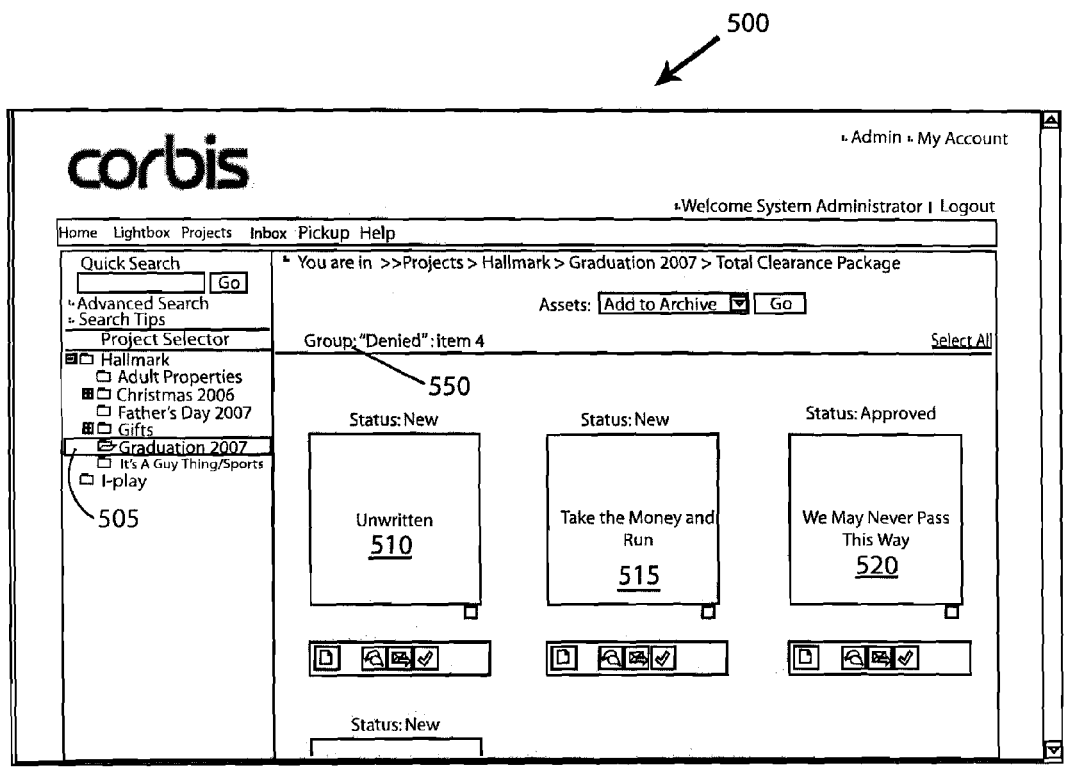
FIG. 5 is a sample user interface for viewing assets for which at least one right has been denied for use within a project, in accordance with an embodiment of the present invention.

Reference is now made to FIG. 5, which is a sample user interface for viewing assets for which at least one right has been denied for use within a project, in accordance with an embodiment of the present invention. Shown in FIG. 5 is a window 500 that displays thumbnails for assets selected by a potential licensee for consideration for use within a project 505 entitled "Graduation 2007". Specifically, the thumbnails in window 500 correspond to those of the selected assets which belong to a "Denied" group 550; namely, those of the selected assets for which at least one rights holder has denied clearance for use within project 505.

The Denied group shown in FIG. 5 includes an "Unwritten" asset 510, a movie "Take the Money and Run" 515, and a movie "We May Never Pass This Way Again" 520. An "Unwritten" asset, also referred to as a "meta-data only" asset, is an asset which is not physically or electronically present within a rights clearance system. In such case, the rights clearance system acts as a broker, which clears rights for assets that are licensed by a third party.

In accordance with an embodiment of the present invention, an asset is automatically moved into the Denied group if one or more of the entries in its list of rights holders have a status of "Denied". Conversely, if the statuses should change so that none of the entries have a "Denied" status, then the asset is automatically pulled from the Denied group.

In accordance with an embodiment of the present invention, tracking module 135 identifies to the customer possible substitutes for assets in the Denied group. For example, if a rights holder to a photo of Marilyn Monroe declines to grant a license to a customer, then tracking module 135 proposes to the customer alternate photos that may be used as a substitute for the denied photo. Such alternate photos are identified by searching through asset database 110.

Figure 6:
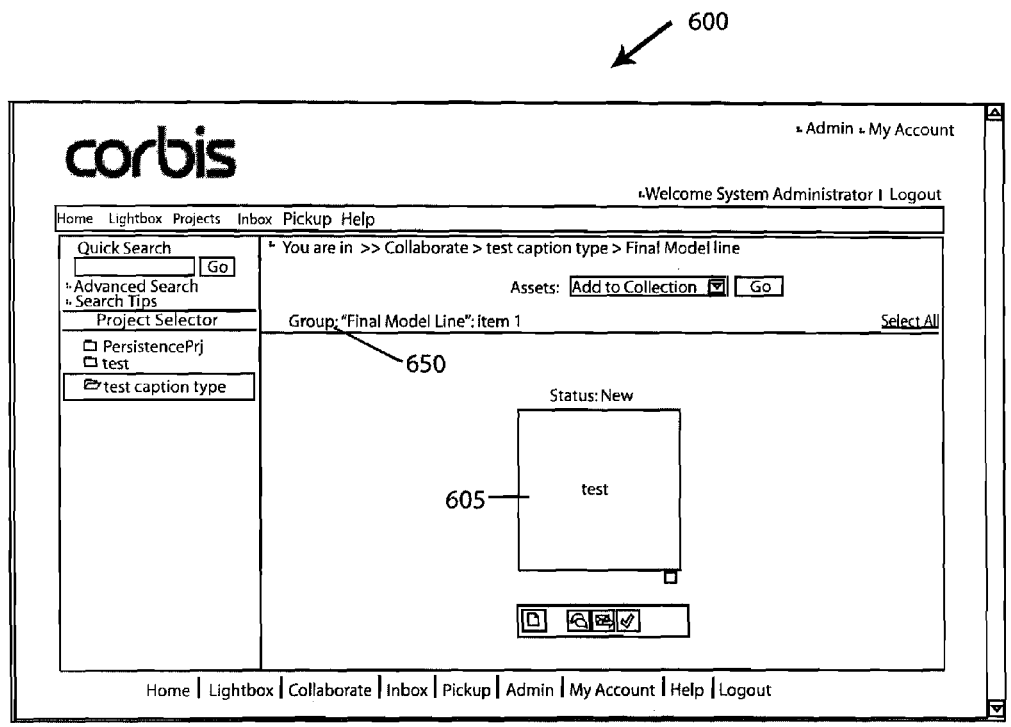
FIG. 6 is a sample user interface for viewing assets that have been selected for use within a project, in accordance with an embodiment of the present invention.

Reference is now made to FIG. 6, which is a sample user interface for viewing assets that have been committed to be licensed for use within a project, in accordance with an embodiment of the present invention. Shown in FIG. 6 is a window 600 that displays thumbnails for assets selected by a potential licensee for use within a project. Specifically, the thumbnails in window 600 correspond to those assets which belong to a "Final Model Line" group 650; namely, those of the selected assets which have been committed for inclusion within the project. Only assets from the Total Clearance Package 450 from FIG. 4 are eligible for commitment.

Use of the Final Model Group 650 in this embodiment of the present invention is of advantage where more than one level of approval is required for committing assets for inclusion within a project. When a final storyboard or layout for a project is created and composed and approved by the project designers, final approval may further be required by one or more management levels. The relevant authorities can collaboratively use this embodiment of the present invention to view and approve the project.

Licensing Module 140

Referring back to FIG. 1, in accordance with an embodiment of the present invention, a licensing module 140 generates digital licenses for the Final Model Line 650 assets, for use within a customer project. A digital license is generally a digital formal contract. Digital licenses are generated when assets are added to the Final Model Group. Tracking module 135 can provide the necessary contract information from Rights Holder Database 115 and Projects Database 130 to Licensing Module 140. In another embodiment, Licensing Module 140 may be in direct communication with Rights Holder Database 115 and/or Projects Database 130. After all approvals are obtained for an asset, the digital license is signed or otherwise approved by a rights holder and a licensee. Approval may include electronic signatures, a secure submission, written signatures, or other indication of approval. The digital licenses are stored in a license database 145 for reference, and linked with the licensed assets in database 110.

In accordance with an embodiment of the present invention, database 145 includes inter alia data that conforms to a schema with metadata as indicated in TABLE V.

TABLE V

Metadata Schema for License Database 145

| Metadata | Description |
| --- | --- |
| License ID | Key: Unique identifier for license |
| Location of License | File system location of digital copy of license |
| Licensor ID | Identifier of rights holder |
| Licensee ID | Identifier of customer |
| Asset ID | Identifier of media asset |
| Project ID | Identifier of customer project in which asset is used |
| Term | Time period of license |
| Territory | Geographical territory of license |
| License Fee | Cost of license |

In addition, licensee entity information is also stored, including inter alia licensee name, point of contact, postal address, telephone number, e-mail address and payment information.

Reporting Module 150

Databases 110 and 145 can be joined and/or queried to enable a reporting module 150 to output a variety of reports. For example, using reporting module 150, a licensee can generate a report of his licenses that are in force, and a report of licenses granted to him for designated assets. A licensor can generate a report of his licenses that are in force, and a report of licenses granted by him for designated assets. A licensing brokerage can generate reports of licenses granted for designated assets.

It may thus be appreciated that system 100 provides a cooperative workflow between customers, right brokers, rights holders and rights approvers.

In reading the above description, persons skilled in the art will realize that there are many apparent variations that can be applied to the methods and systems described. Thus it may be appreciated that the present invention is also advantageous for use with general brokerage systems and services that require rights clearances, in addition to media asset licensing, including inter alia brokering of legal contracts, brokering of real estate rentals and sales, brokering of sales and marketing distributorships, and brokering of services.

What is claimed as new and desired to be protected by Letters Patent is:

1. A computer-implemented method for managing a right in a media asset, comprising:
   maintaining a database of statutory information that specifies conditions under which licenses are required to use the media asset in various governments' territorial jurisdictions;
   receiving a media asset identifier as a result of an interaction with an electronic user interface to identify the media asset on behalf of a prospective licensee of the media asset;
   identifying a rights holder identifier, based at least in part on the media asset identifier, wherein the rights holder identifier indicates a rights holder, who holds a right in the media asset that is not held by the prospective licensee;
   determining the right held by the rights holder, based at least in part on the media asset identifier and the rights holder identifier;
   determining, based on information from the database of statutory information, that an approval to use the media asset according to the right held by the rights holder is required in a particular government's territorial jurisdiction;
   automatically requesting the approval to use the media asset according to the right held by the rights holder, wherein the request includes an indication of a project for which the media asset is requested to be used, and wherein approval to use the media asset for the indicated project is requested from a party that is different than the rights holder;
   providing an indication of whether the approval is granted, based on at least one response to the request.

2. The method of claim 1, wherein the media asset identifier includes a media location identifier that specifies a media asset storage location that is accessible over an electronic network remotely from a rights management system that received the media asset identifier.

3. The method of claim 1, wherein the right held by the rights holder is one of a plurality of rights held by a plurality of rights holders for the media asset.

4. The method of claim 1, further comprising:
   receiving a status request; and
   providing a status of whether the approval is granted.

5. The method of claim 4, further comprising enabling a user to edit information associated with the right, wherein editing is initiated through a control in a user interface that provides the status of whether the approval is granted.

6. The method of claim 5, further comprising providing a user interface to view of a history of edits to the information associated with the right.

7. The method of claim 1, further comprising:
   determining that the right is no longer enforceable; and
   automatically approving use of the media asset according to the right that is no longer enforceable.

8. The method of claim 1, further comprising associating the media asset identifier with a total clearance group of media assets for which all required rights have been approved for use in the project, if the response indicates that the request for approval is approved.

9. The method of claim 1, further comprising:
   determining that the response indicates that the request for approval is approved;
   receiving an indication that the media asset is committed for final approval to be licensed for use, and
   associating the media asset identifier with a final group of media assets for which all required rights have been approved for use in the project, and for which another level of approval is required to use the media asset for the project.

10. The method of claim 1, further comprising automatically establishing a license to use the media asset, if the response indicates that the request for approval is approved.

11. The method of claim 1, further comprising adding the media asset identifier to a denied group, if the response indicates that the request for approval is not approved.

12. A non-transitory machine readable medium including instructions that cause a machine to perform the operations of claim 1.

13. A system for managing a right in a media asset, comprising:
- a computer processor;
- a database of statutory information that includes records that specify conditions under which licenses are required to use a media asset in various governments' territorial jurisdictions;
- a rights analyzer, implemented by said processor, that performs a plurality of operations, including:
  - receiving a media asset identifier as a result of an interaction with an electronic user interface to identify the media asset on behalf of a prospective licensee of the media asset;
  - identifying a rights holder identifier based at least in part on the media asset identifier, wherein the rights holder identifier indicates a rights holder, who holds a right in the media asset that is not held by the prospective licensee;
  - determining the right held by the rights holder, based at least in part on the media asset identifier and the rights holder identifier;
  - determining, based on information from the database of statutory information, that an approval to use the media asset according to the right held by the rights holder is required in a particular government's territorial jurisdiction; and
- a rights clearance module, implemented by said processor, in communication with the rights analyzer, wherein the rights clearance module performs a plurality of operations, including:
  - automatically requesting the approval to use the media asset according to the right held by the rights holder, wherein the request includes an indication of a project for which the media asset is requested to be used, and wherein approval to use the media asset for the indicated project is requested from a party that is different than the rights holder; and
- a rights tracking module, implemented by said processor, in communication with the rights clearance module, wherein the rights tracking module performs a plurality of operations, including providing an indication of whether the approval is granted, based on a response to the request.

14. The system of claim 13, wherein the right held by the rights holder is one of a plurality of rights held by a plurality of rights holders for the media asset.

15. The system of claim 13, wherein the rights analyzer further performs the operations of:
- accessing a statutory information data store that includes information on the enforceability of rights;
- determining that the right is no longer enforceable; and
- indicating to the rights clearance module that use of the media asset should be allowed according to the right that is no longer enforceable.

16. The system of claim 13, wherein the tracking module further performs the operations of:
- receiving an indication that the response indicates that the request for approval is approved;
- receiving an indication that the media asset is committed for final approval to be licensed for use; and
- associating the media asset identifier with a final group of media assets for which all required rights have been approved for use in the project, and for which another level of approval is required to use the media asset for the project.

17. The system of claim 13, further comprising a licensing module, implemented by said processor, in communication with the tracking module, wherein the licensing module performs a plurality of operations, including automatically establishing a license to use the media asset, if the response indicates that the request for approval is approved.

18. The system of claim 13, further comprising:
- a licenses data store, storing a license for the media asset as a result of the response indicating that the request for approval is approved; and
- a reporting module, implemented by said processor, in communication with the licenses data store and performing a plurality of operations, including producing a report that the license for the media asset.

19. A computer-implemented method for managing rights in a media asset, comprising:
- maintaining a database of statutory information that specifies conditions under which licenses are required to use the media asset in various governments' territorial jurisdictions;
- receiving a media asset identifier as a result of an interaction with an electronic user interface to identify the media asset on behalf of a prospective licensee of the media asset;
- identifying a plurality of rights holders, based at least in part on the media asset identifier, wherein each of the plurality of rights holders holds a right in the media asset that is not held by the prospective licensee;
- determining each right held by each of the plurality of rights holders, based at least in part on the media asset identifier;
- determining for each of the plurality of rights holders, based on information from the database of statutory information, that an approval to use the media asset according to the right held by the respective rights holder is required in a particular government's territorial jurisdiction;
- automatically requesting the approval to use the media asset for a project indicated by the prospective licensee according to each right held by each of the plurality of rights holders, and wherein approval to use the media asset for the indicated project is requested from a party that is different than at least one of the plurality of rights holders; and
- providing an indication of whether the approval is granted, based on at least one response to the request.

20. The method of claim 19, further comprising:
- identifying a right that is no longer enforceable; and
- automatically approving use of the media asset according to the right that is no longer enforceable.

21. The method of claim 19, further comprising automatically establishing a license to use the media asset between the prospective licensee and each of the plurality of rights holders.

22. The method of claim 19, wherein the media asset comprises one of the following; a media asset, a legal contract, a real estate asset, a distribution asset, and a service.

* * * * *